(12) United States Patent
Bernardi et al.

(10) Patent No.: US 7,232,280 B2
(45) Date of Patent: Jun. 19, 2007

(54) GROUT GUIDE ATTACHMENT

(75) Inventors: Walter Bernardi, Highland Park, IL (US); Michael Landt, Chicago, IL (US)

(73) Assignee: Credo Technology Corporation, Broadview, IL (US)

( * ) Notice: Subject to any disclaimer, the term of this patent is extended or adjusted under 35 U.S.C. 154(b) by 378 days.

(21) Appl. No.: 10/446,945

(22) Filed: May 28, 2003

(65) Prior Publication Data

US 2004/0240956 A1  Dec. 2, 2004

(51) Int. Cl.
*B23C 1/20* (2006.01)
*B23C 9/00* (2006.01)

(52) U.S. Cl. ............... 409/137; 409/138; 409/182; 144/136.95; 144/154.5

(58) Field of Classification Search ............. 409/137, 409/138, 175, 178, 182; 144/2.1, 3.1, 1.1, 144/48.5, 136.1, 136.95, 154.5, 252.1, 252.2; 451/449, 456; 83/100
See application file for complete search history.

(56) References Cited

U.S. PATENT DOCUMENTS

| | | | | |
|---|---|---|---|---|
| 2,635,655 | A * | 4/1953 | Linstead ................. 144/134.1 |
| 3,285,135 | A * | 11/1966 | Shaw ........................ 409/180 |
| 4,608,291 | A * | 8/1986 | Gove ........................ 428/119 |
| 4,674,548 | A * | 6/1987 | Mills et al. .............. 144/154.5 |
| 4,993,897 | A * | 2/1991 | Anderhalden ............... 409/180 |
| D353,314 | S * | 12/1994 | Jaslow .......................... D8/70 |
| 5,853,274 | A * | 12/1998 | Coffey et al. ............... 409/182 |
| 5,988,954 | A * | 11/1999 | Gaskin et al. ................ 408/67 |
| 6,027,289 | A * | 2/2000 | Posh .......................... 409/180 |
| 6,050,759 | A * | 4/2000 | Bone .......................... 409/182 |
| 6,244,796 | B1 * | 6/2001 | Schuebel et al. ............ 409/180 |
| 6,374,878 | B1 * | 4/2002 | Mastley et al. ............ 144/48.6 |
| 6,679,658 | B2 * | 1/2004 | Landt ......................... 409/182 |
| 6,712,368 | B2 * | 3/2004 | Bohn et al. ................. 279/143 |
| 6,755,597 | B2 * | 6/2004 | Bergner et al. ............. 409/178 |
| 6,779,954 | B2 * | 8/2004 | Tomayko ..................... 409/182 |
| 6,835,030 | B2 * | 12/2004 | Pozgay et al. .............. 408/182 |
| 7,029,212 | B2 * | 4/2006 | Adkins et al. .............. 409/180 |
| 2004/0081524 | A1 * | 4/2004 | Barnett ....................... 409/132 |
| 2004/0208719 | A1 * | 10/2004 | Adkins et al. ............... 409/180 |
| 2004/0247407 | A1 * | 12/2004 | Tillemans et al. .......... 409/137 |
| 2005/0025599 | A1 * | 2/2005 | Kopras et al. .............. 409/182 |
| 2005/0081954 | A1 * | 4/2005 | Wielechowski ........ 144/136.95 |
| 2005/0180828 | A1 * | 8/2005 | Steimel et al. .............. 409/137 |

* cited by examiner

*Primary Examiner*—Monica Carter
*Assistant Examiner*—Michael W. Talbot
(74) *Attorney, Agent, or Firm*—Greer, Burns & Crain, Ltd.

(57) ABSTRACT

A guide attachment for a rotary hand tool is disclosed that comprises a housing, an adapter and a removable base. The attachment is configured to remove grout from between adjacent tiles, such as floor or wall tiles. The housing of the preferred embodiment is configured to permit a tool bit to engage a work surface at the normal intersection of two planes. The removable base of the preferred embodiment permits the attachment to work on flat surfaces. The base is also reversible and contains multiple sets of guide points for guiding the tool bit along grooves that have different widths. The preferred embodiment can also include a vacuum adapter that is attachable to the housing and allows a vacuum hose to be coupled to the guide attachment for removing debris during operation. The configuration of the housing or locking mechanism accommodates adapters having different circumferences.

27 Claims, 8 Drawing Sheets

GROUT GUIDE ATTACHMENT

BACKGROUND OF THE INVENTION

The invention generally relates to rotary hand tools and more particularly to a removable guide attachment for use with a rotary hand tool.

Guide assemblies that can be attached to various types of rotary hand tools are certainly known in the art. A task that is carried out by artisans and homeowners involves the removal and replacement of grout between tiles in floor and wall tiled surfaces. This is often a very difficult task to complete without a specialty rotary tool or a guide attachment for a multiple use commercially available rotary hand tools. One well-known attachment device utilizes two separate components, a housing and an adapter, where the adapter is coupled to a hand drill or other rotary hand tool, and the adapter and housing can be locked in various positions. A grout removal bit is held in a collet and engages a work surface.

This known guide attachment presents the user with some limitations. The housing is configured for removing grout from flat surfaces only, and does not permit the user to remove grout from corners. The base of the housing has guide points to help keep the bit centered in the groove between adjacent tiles of the work surface, but the guide points are a fixed width that may not correspond to the width of the groove. As a result, the bit may wander off center when the desired work surface is wider than the guide points and render the guide points ineffective when the work surface is narrower than the width of the guide points. The guide points wear rapidly because they are made of a relatively soft material, and the housing is not configured to receive a vacuum port for removing debris during operation. The housing/locking mechanism configuration only accommodates adapters of a certain width which makes it difficult to attach the guide attachment to rotary hand tools of varying widths.

SUMMARY OF THE INVENTION

The preferred embodiment of the invention comprises a guide attachment that comprises a housing, an adapter and a removable base. The housing of the preferred embodiment is configured to permit a bit to engage a work surface at the normal intersection of two planes. The removable base of the preferred embodiment is reversible and contains multiple sets of guide points. The preferred embodiment can also include a vacuum adapter that is attachable to the housing and allows a vacuum hose to be coupled to the guide attachment. The housing/locking mechanism configuration of the preferred embodiment accommodates adapters of different circumferences.

DETAILED DESCRIPTION OF THE PREFERRED EMBODIMENT

Broadly stated, the preferred embodiment of the invention comprises a guide attachment that includes a housing, an adapter, a removable base and may also include a vacuum adapter. The housing is configured to permit a bit to engage a work surface at the normal intersection of two planes and thereby enables a user to remove grout at the intersection of wall and floor tiles. The removable base can be attached to the housing when a user is working on a flat surface. The base is reversible and contains multiple sets of guide points, which allows a user to remove grout from work surfaces of different widths more effectively. This arrangement also allows the guide points to be made of a more durable material than that of the housing, which increases the useful life of the guide points.

The preferred embodiment of the invention can also include a vacuum adapter that can be attached to the housing, which allows a user to utilize a vacuum hose to remove debris from the work surface while operating the rotary hand tool. The preferred embodiment of the invention also includes a housing or locking mechanism that accommodates adapters of different widths, and thereby enables the user to use the guide attachment with rotary hand tools of various sizes.

Figure 1:
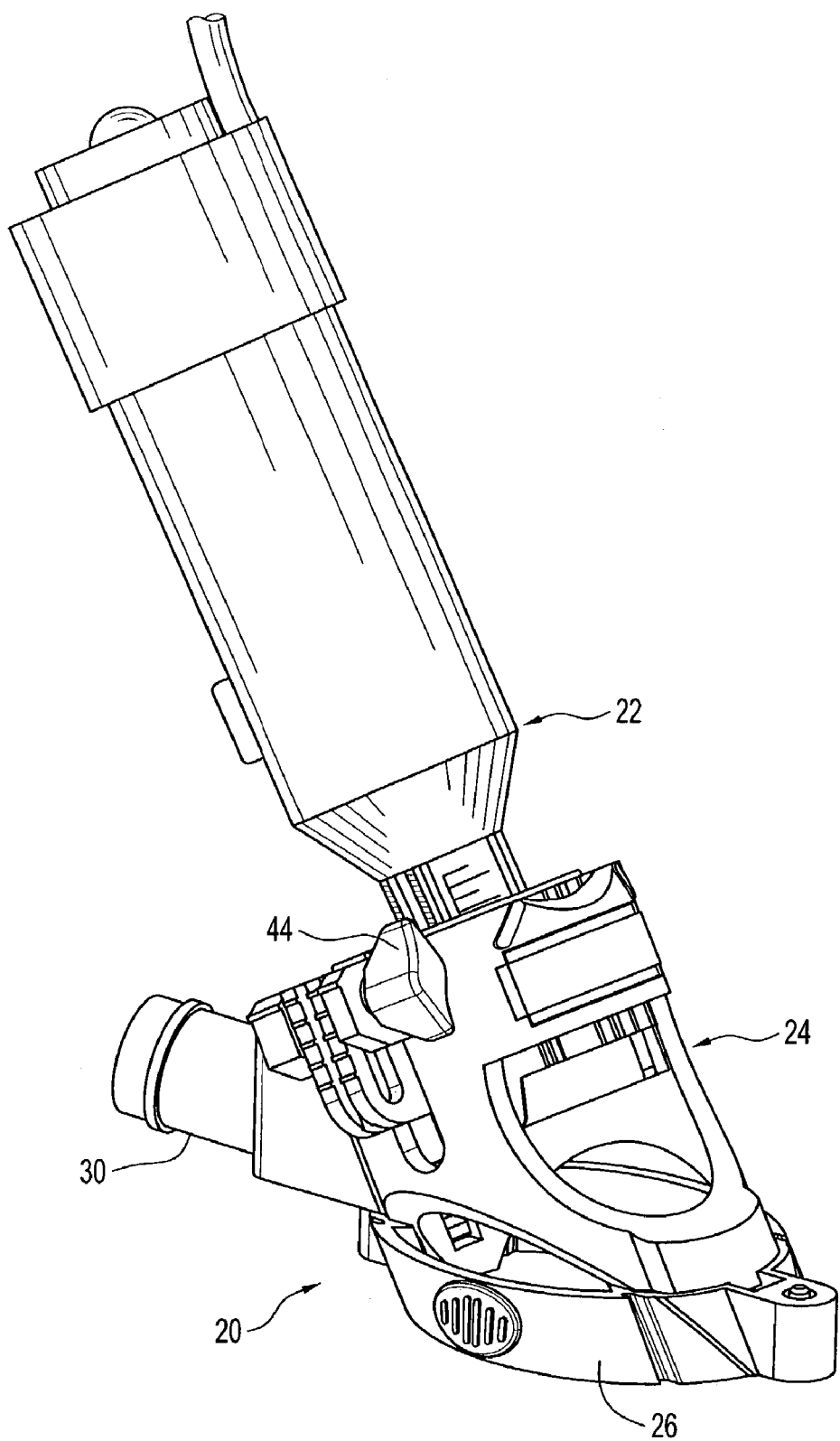
FIG. 1 is a perspective view of a rotary hand tool attached to the preferred embodiment of the guide attachment.

Referring now to the drawings, and particularly FIG. 1, the preferred embodiment of the guide attachment of the present invention, indicated generally at 20, is shown attached to a rotary hand tool, indicated generally at 22. The tool 22 includes a collet and a bit (both not shown) for engaging a work surface. The rotary hand tool 22 is of the type that has an electric motor that drives an output shaft to which the collet is attached and is indicated as axis A (see FIG. 5). The hand tool may be a rotary hand tool such as those marketed under the Dremel® brand made by the Robert Bosch Tool Corporation of Chicago, Ill. The tool may also be an electric drill or other rotary tool, provided that the tool has a stationary nose portion adjacent to the collet that is configured so that the guide attachment can be attached to the tool.

While the preferred embodiment of the attachment 20 is capable of many uses, it is particularly configured for removing grout from tiled work surfaces such as bathroom and kitchen floors and walls. Such work surfaces typically have grout between adjacent tiles, which periodically needs to be replaced. The attachment 20 is configured to be attached to a rotary hand tool having a tool bit such as a spiral saw tool bit installed in the tool. The preferred embodiment of the invention can be adjusted to achieve a desired depth of penetration by the bit in the grout so that old grout can be removed without damaging the underlying supporting surface to which the tile is installed and without damaging the individual tiles between which the grout is being removed. Once the old grout is removed, new grout can be installed.

Figure 2:
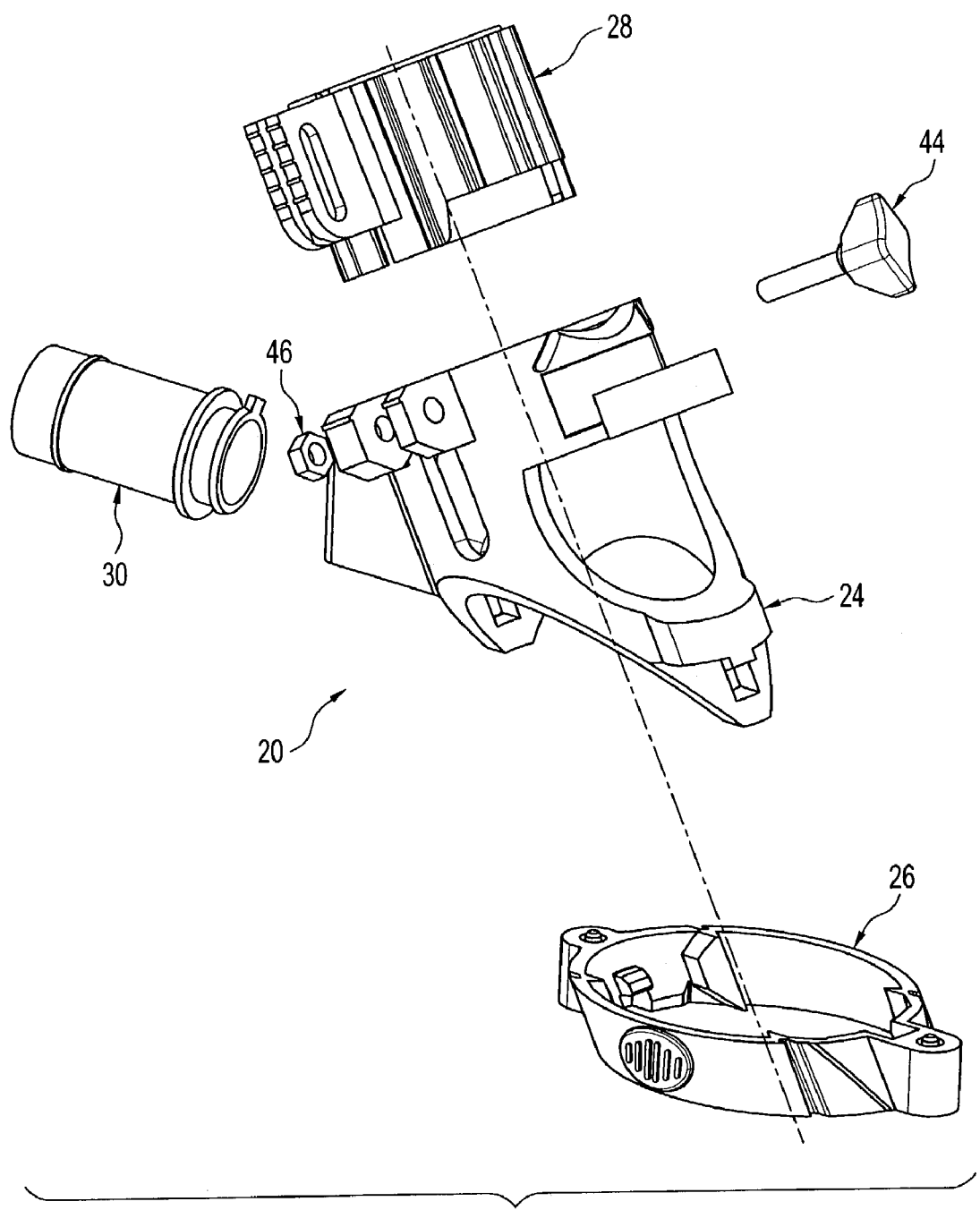
FIG. 2 is an exploded perspective view of the present guide attachment.

Turning now to FIG. 2, the guide attachment 20 is shown in an exploded perspective view and disengaged from the rotary hand tool 22. The illustrated guide attachment has four pieces, a housing 24, a removable base 26, an adapter 28 and a vacuum adapter 30. All four pieces are preferably made of a plastic or other lightweight durable material.

In FIGS. 3–6, the preferred embodiment of the housing 24 is shown to include a lower portion 32 and an upper portion 34. The lower portion 32 is located in a plane that is at an acute angle Θ from the axis of rotation A (see FIG. 5). In the preferred embodiment, the lower portion 32 is angled about 60 degrees from the axis of rotation A. This angled lower portion 32 allows the user to comfortably hold the rotary hand tool 22 while working on any surface, such as a floor, wall or ceiling.

The lower portion 32 is preferably generally v-shaped when viewed from the front (see FIGS. 3 and 4), which allows the bit (not shown) to engage a work surface that results from the normal intersection of two planes. This configuration allows a user to more easily remove grout from corners that result from a wall and a ceiling or a wall and the floor, for example. The lower portion 32 also includes removable base receiving openings 36 (see FIGS. 3 and 4), which are preferably located 180 degrees apart from each other, one located on the longest end and the other on the shortest end. The removable base receiving openings 36 allow a user to attach the removable base 26 to the housing 24.

The upper portion 34 of the housing 24 is preferably generally cylindrical in shape, the interior surface 38 (see FIG. 6) of which is adapted to receive the adapter 28. The upper portion 34 of the housing 24 also includes a gap 39 (see FIG. 5), which is adapted to receive the adapter flanges 52 (see FIGS. 10–13). This configuration allows a user to place an adapter 28 inside the housing 24.

Figure 3:
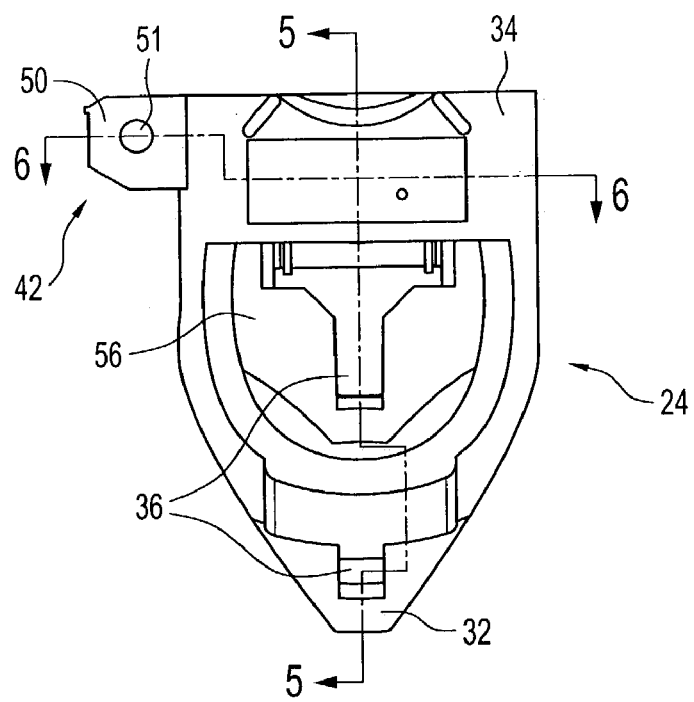
FIG. 3 is a front view of a housing of the present guide attachment.
Figure 4:
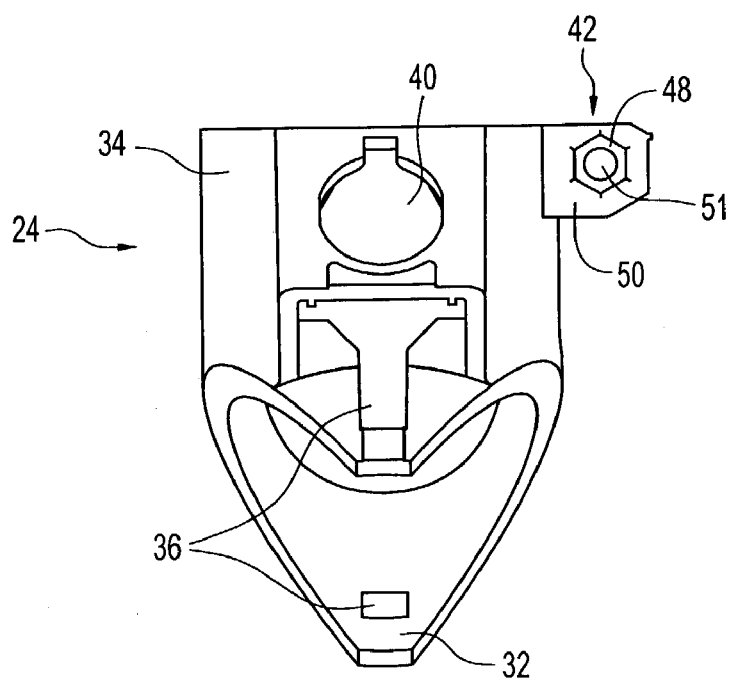
FIG. 4 is a rear view of a housing of the present guide attachment.
Figure 5:
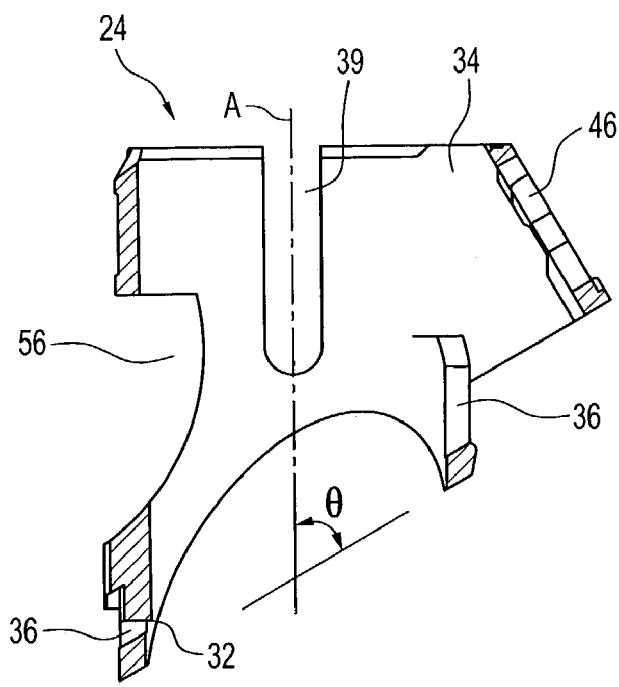
FIG. 5 is a sectional view of the housing taken along lines 5—5 of FIG. 3.
Figure 6:
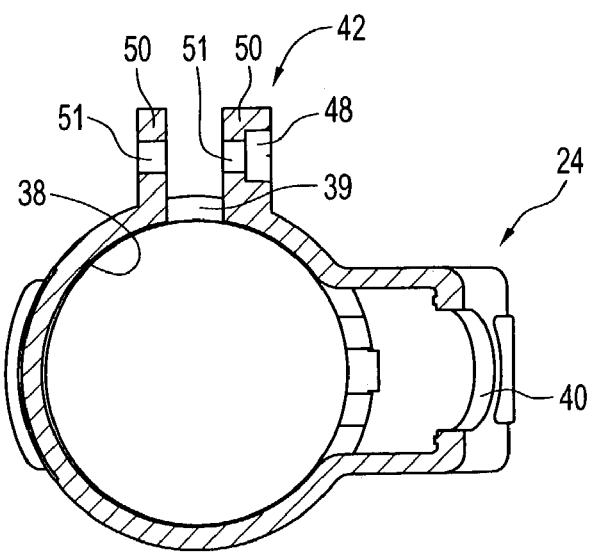
FIG. 6 is a sectional view of the housing taken along the lines 6—6 of FIG. 3.

The upper portion 34 also includes a vacuum adapter generally cylindrically shaped receiving opening 40 (see FIG. 4), which is preferably located opposite of the viewing opening 56 (see FIGS. 3 and 5). The vacuum adapter receiving opening 40 is configured to receive the vacuum adapter 30, which allows a user to attach a vacuum hose to the housing 24 for the purpose of removing debris from the work during operation.

The upper portion 34 also includes a locking mechanism 42 for adjustably locking the adapter 28 to the housing 24. The locking mechanism 42 preferably includes a threaded bolt with an enlarged knob 44 and a nut 46 (see FIG. 2) the latter of which is retained in a recess 48 in one of two housing flanges 50 (see FIGS. 4 and 6). The housing flanges 50 also include cylindrical openings 51 to receive the threaded bolt 44. When the adapter 28 is placed in the housing 24, two adapter flanges 52 (see FIGS. 10–13) with elongated cylindrical openings 54 align with the housing flanges 50 such that the cylindrical openings 51 of the housing flanges 50 and the elongated cylindrical openings 54 of the adapter flanges 52 are aligned. The threaded bolt 44 is inserted through the housing flanges 50 and the adapter flanges 52 until it engages the nut 46 that is retained in the recess 48. Once the threaded bolt 44 engages the nut 46, it is turned until the adapter 28 is securely locked in a position relative to the housing 24. This configuration allows a user to switch out adapters 28 and to set the depth of the bit (not shown) engaging the work surface.

The illustrated preferred embodiment of the housing 24 also includes a viewing opening 56 located on the longer end of the housing, which opening extends almost the entire length of both the lower portion 32 and the upper portion 34 of the housing 24, and allows a user to easily see the bit as it engages the work surface.

Figure 7:
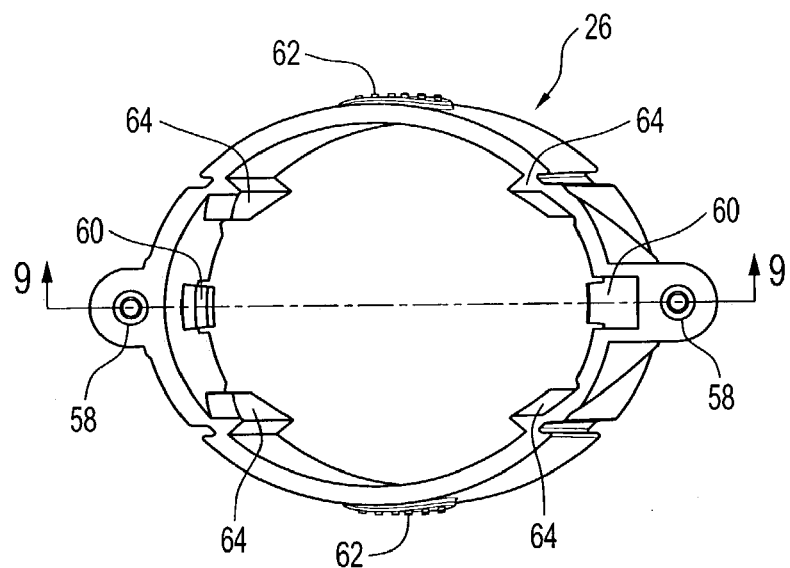
FIG. 7 is a top view of a removable base of the present guide attachment.
Figure 8:
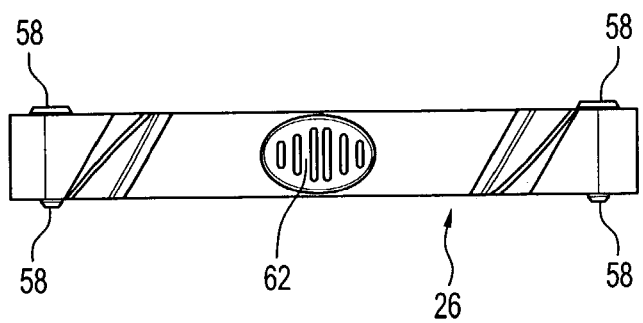
FIG. 8 is a side view of a removable base of the present guide attachment.
Figure 9:
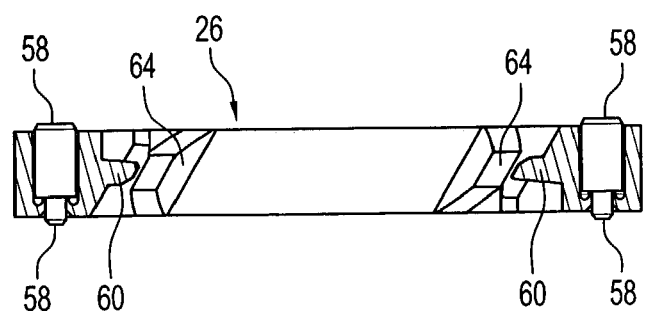
FIG. 9 is a sectional view of the removable base taken along the lines 9—9 of FIG. 7.

Turning now to the removable base 26 of the preferred embodiment, and referring to FIGS. 7–9, it includes two sets of guide protrusions 58. Each set of guide protrusions 58 consists of two guide points that are preferably located 180 degrees apart from each other. The guide protrusions 58 are configured to engage the grout retaining recess that is typically defined by the gap between adjacent tiles and keep the bit in a centered position in the recess, which facilitates easy and uniform grout removal by a user. Having two sets of guide protrusions 58, each set of which preferably have different widths, allows a user to select the set of guide protrusions 58 based on the width of the grout between adjacent tiles in a particular work surface. The guide protrusions 58 are preferably made of a hard, durable material such as steel to insure long wear of the protrusions.

The preferred embodiment of the removable base 26 also includes two base snaps 60 that are preferably located 180 degrees apart from each other. These base snaps 60 are configured to engage the removable base receiving openings 36 of the lower portion 32 of the housing 24. The base snaps 60 are further configured such that the removable base 26 can be reversibly affixed to the housing 24. This allows a user to attach the removable base 26 to the housing 24 in two different orientations.

The preferred embodiment of the removable base 26 also includes gripping surfaces 62 that are preferably located 180 degrees apart from each other so that a line drawn through each gripping surface 62 is perpendicular to a line that connects the base snaps 60. This configuration of the preferred embodiment allows the user to easily detach the removable base 26 from the housing 24 by squeezing the gripping surfaces 62 while pulling the removable base 26 away from the housing 24. The user can then replace the removable base 26 in the opposite orientation or utilize the guide attachment 20 without it.

The preferred embodiment of the removable base 26 also includes raised angled surfaces 64 that are preferably located around the inner circumference of the removable base 26. The raised angled surfaces 64 are configured to engage the housing 24 so that the removable base 24 is secure when attached to the housing 24 in either orientation. This configuration allows a user to engage a work surface with the same stability as if the removable base 26 and the housing 24 were one solid piece.

Turning now to the adapter 28 and referring to FIGS. 10–13, it is shown to comprise a generally hollow cylinder with the two adapter flanges 52 that contain elongated cylindrical openings 54. The adapter 28 also includes a depth indicator panel 66 on the ends of the adapter flanges 52. The depth indicator panel 66 has a number of lines formed on it at known incremental distances, which allow a user to determine the depth of the bit in the grout before engaging a work surface. The adapter 28 also includes a viewing window 68 (see FIGS. 10 and 12) that is aligned with the viewing opening 56 of the housing 24 when the adapter 28 is placed inside the housing 24. The viewing window 68 allows the user to place the adapter 28 in the housing 24 without blocking sight of the bit engaging the work surface.

The preferred embodiment of the adapter 28 also includes a vacuum window 70 (see FIGS. 10 and 12) that is aligned with the vacuum adapter receiving opening 40 of the housing 24 when the adapter 28 is placed inside the housing 24. The vacuum window 70 allows the user to place the adapter 28 in the housing 24 without hindering the removal of debris from the work surface.

The adapter 28 preferably also includes adapter guides 72, which ensure that the adapter 28 is aligned correctly within the housing 24. The adapter guides 72 prevent a user from placing the adapter 28 inside the housing 24 in an orientation that does not maximize the utility of the guide attachment 20. The adapter 28 also includes an internal coupling mechanism 74 that is configured to attach the guide attachment 20 to the rotary hand tool 22. Two alternative preferred embodiments of the adapter 28 that are configured for rotary hand tools of varying sizes are disclosed.

Figure 10:
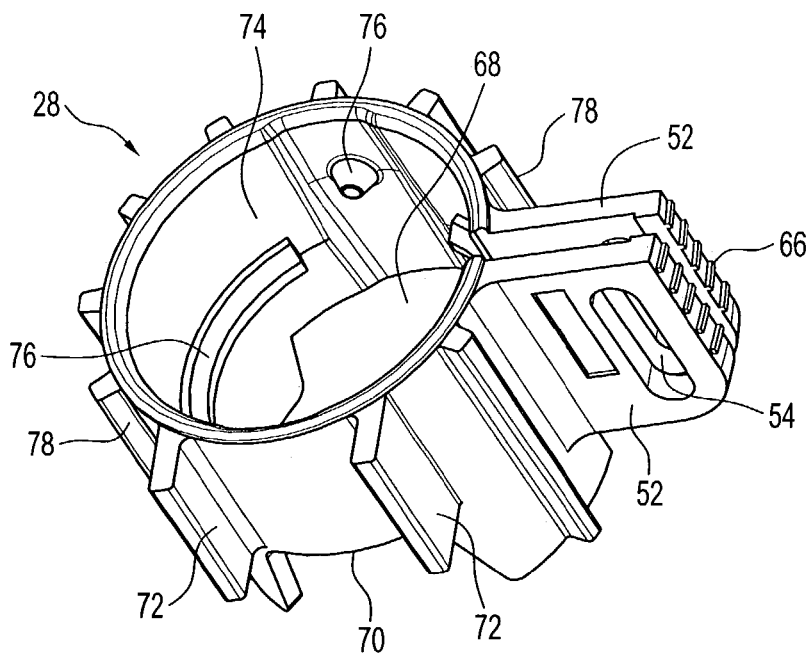
FIG. 10 is a perspective view of an adapter of the present guide attachment.
Figure 11:
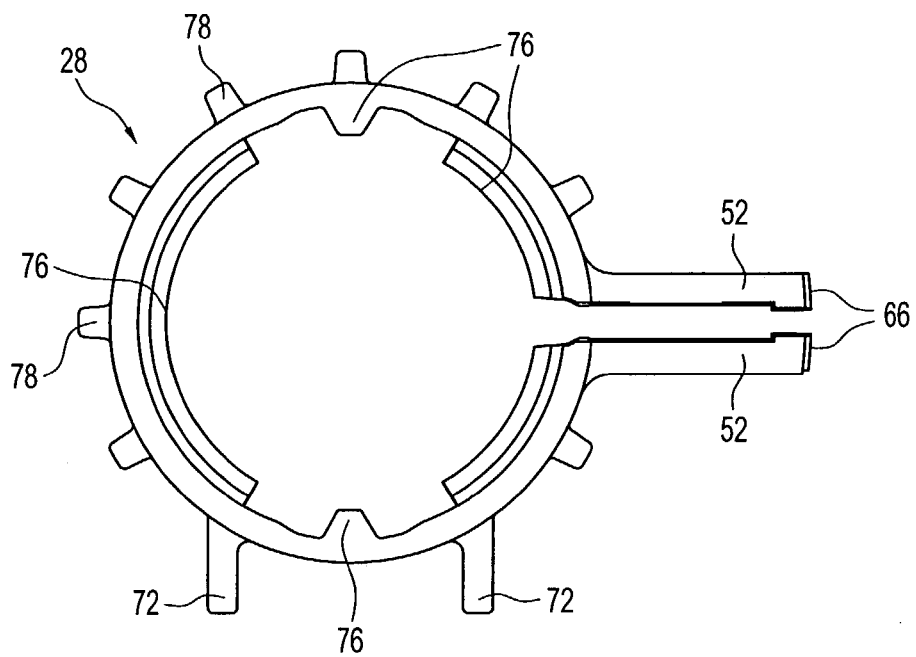
FIG. 11 is a top view of the adapter shown in FIG. 10.

In the embodiment shown in FIGS. 10 and 11, the internal coupling mechanism 74 includes a pair of internal threads 76 in the adapter 28 that are configured to engage a cooperating external threaded configuration located on the rotary hand tool 22. The use of the threads 76 permits easy attachment and removal of the guide attachment 20 to the rotary hand tool 22. The adapter 28 also includes a plurality of longitudinally oriented external ribs 78 arranged around the circumference of the adapter 28. These longitudinal ribs 50 are configured to engage the housing 24 so that the adapter 28 is secure when placed inside the housing 24. This configuration allows a user to utilize the guide attachment 20 more effectively by enhancing the stability of the adapter 28 in the housing 24.

Figure 12:
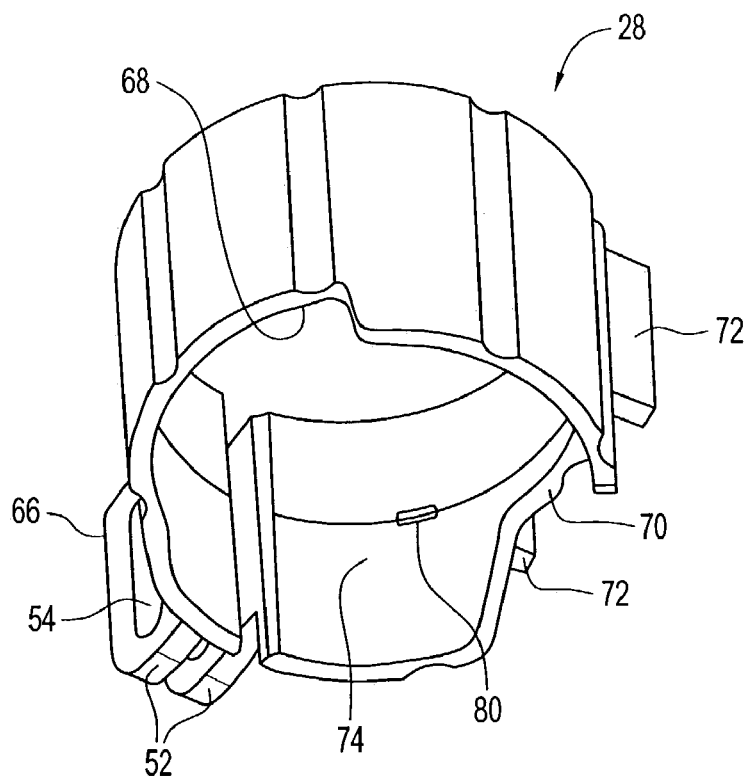
FIG. 12 is a perspective view of an adapter of the present guide attachment.
Figure 13:
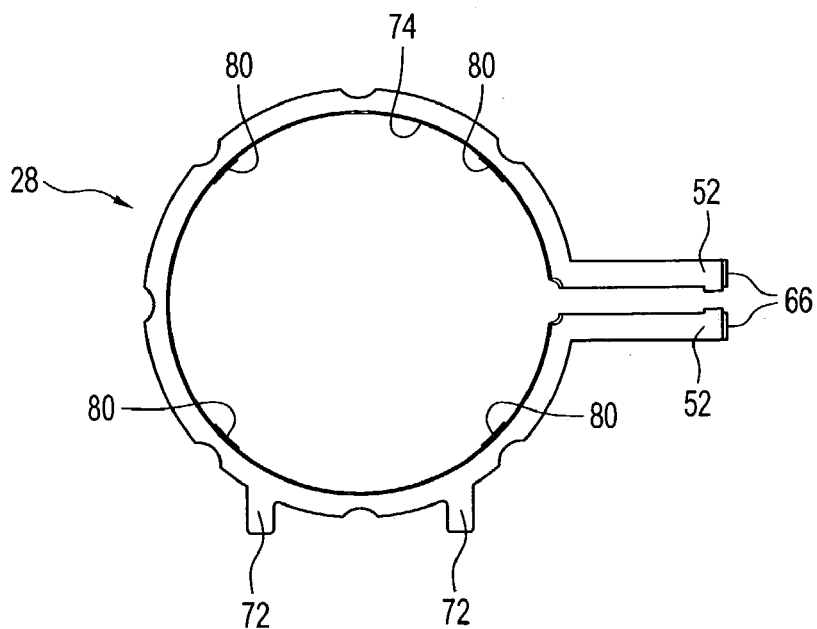
FIG. 13 is a top view of the adapter shown in FIG. 12.

In the embodiment shown in FIGS. 12 and 13, the internal coupling mechanism includes a series of raised tabs 80 in the adapter 28 that are configured to engage corresponding recesses in a rotary hand tool 22. The use of the raised tabs 80 facilitates easy attachment and removal of the guide attachment 20 to the rotary hand tool 22.

Figure 14:
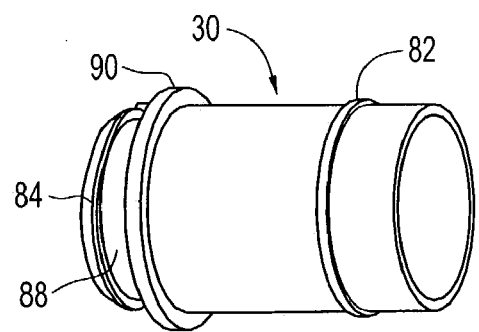
FIG. 14 is a perspective view of a vacuum adapter of the present guide attachment.
Figure 15:
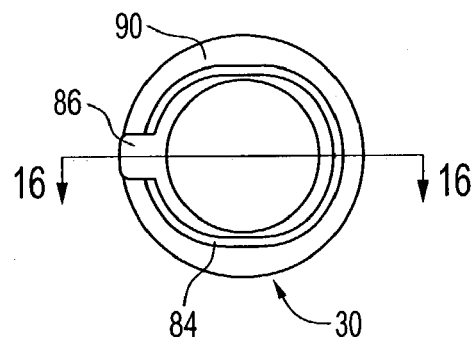
FIG. 15 is a top view of a vacuum adapter of the present guide attachment; and, FIG. 16 is a sectional view of the vacuum adapter taken along the lines 16—16 of FIG. 15.
Figure 16:
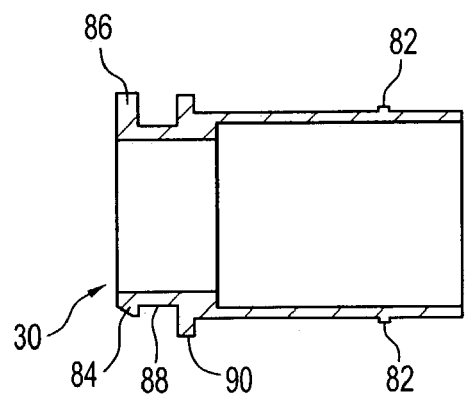

Turning now to the vacuum adapter 30, and referring to FIGS. 14–16, it comprises a preferably generally hollow cylinder that includes an external annular flange 82 about the circumference of the vacuum adapter 30, which allows a user to securely attach a vacuum hose to the vacuum adapter 30. The vacuum adapter 30 also includes an angled edge 84 (see FIG. 16) with a raised tab 86 (see FIG. 15), an annular recess 88, a raised annular flange 90, the configuration of which allows a user to securely attach the vacuum adapter 30 to the housing 24.

While a preferred embodiment of the present invention has been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the present invention are set forth in the following claims.

What is claimed is:

1. A removable guide attachment for a rotary hand tool of the type which has an outer enclosure, a rotating collet rotating about an axis and a bit mounted in the collet for engaging a work surface, said attachment comprising:
    a housing configured to allow the bit to engage a work surface at the intersection of two perpendicular planes wherein said housing includes an opening for receiving the rotary hand tool and a base portion located in a plane which is at an acute angle relative to the rotating axis, said housing having side portions which form a V shape for contacting and being guided by said two perpendicular intersecting planes, said side portions merging with said base portion, the bit extending below said base portion to engage the work surface;
    an adapter configured for coupling to the rotary hand tool and wherein said opening is configured for receiving said adapter and said housing includes a locking mechanism for securing said adapter in a plurality of longitudinal positions relative to said housing;
    said housing having a viewing opening for viewing the bit engaging the work surface and said adapter includes an opening aligned with said viewing opening.

2. A removable guide attachment according to claim 1 further comprising a removable vacuum adapter configured for coupling to a port and wherein said housing includes a port configured for receiving said vacuum adapter.

3. A removable guide attachment according to claim 1 further comprising a removable base configured for coupling to said housing wherein said removable base includes at least two guide points located 180 degrees apart for guiding the bit and said base portion along the work surface and wherein said housing is configured for receiving said removable base.

4. A removable guide attachment for a rotary hand tool of the type which has an outer enclosure, a rotating collet rotating about an axis and a bit mounted in the collet for engaging a work surface, said apparatus comprising:
    a housing configured for receiving a removable base wherein said housing includes an opening for receiving the rotary hand tool and a base portion located in a plane which is at an acute angle relative to the rotating axis, said housing having side portions which define a V shape and merge with said base portion, said V shape enabling said housing to contact and be guided by surfaces of two perpendicular planes that intercept with one another, and wherein said base portion is located adjacent the intersection of two perpendicular planes and the bit extends below said base portion and engages the work surface; and
    a removable base configured for coupling to said housing wherein said removable base includes at least two sets of two guide points wherein said two guide points of each set are located 180 degrees apart for guiding the bit and said base portion along the work surface.

5. A removable guide attachment according to claim 4 further comprising an adapter configured for coupling to the rotary hand tool and wherein said opening is configured for receiving said adapter and said housing includes a locking mechanism for securing said adapter in a plurality of longitudinal positions relative to said housing.

6. A removable guide attachment according to claim 4 wherein said housing includes a viewing opening for viewing the bit engaging the work surface.

7. A removable guide attachment according to claim 4 further comprising a vacuum adapter configured for coupling to a port and wherein said housing includes a port configured to receive said vacuum adapter.

8. A removable guide attachment according to claim 4 wherein said housing is configured to permit the bit to engage a work surface located at the intersection of two perpendicular planes.

9. A removable guide attachment according to claim 4 wherein said removable base is configured for coupling to said housing in more than one orientation.

10. A removable guide attachment according to claim 4 wherein said removable base includes at least one raised surface for ensuring a secure fit between said removable base and said housing.

11. A removable guide attachment according to claim 4 wherein said removable base includes at least two gripping surfaces located 180 degrees apart for aiding in the removal of said removable base.

12. A removable guide attachment for a rotary hand tool of the type which has an outer enclosure, a rotating collet rotating about an axis and a bit mounted in the collet for engaging a work surface, said apparatus comprising:
   a housing configured for receiving a removable base wherein said housing includes an opening for receiving the rotary hand tool and a base portion located in a plane which is at an acute angle relative to the rotating axis;
   a removable base configured for coupling to said housing wherein said removable base includes at least two sets of two guide points wherein said two guide points of each set are located 180 degrees apart for guiding the bit and said base portion along the work surface.

13. A removable guide attachment for a rotary hand tool of the type which has an outer enclosure, a rotating collet rotating about an axis and a bit mounted in the collet for engaging a work surface, said apparatus comprising:
   an adapter configured for coupling to the rotary hand tool wherein said adapter includes at least one longitudinal flange for engaging a locking mechanism;
   a housing having an opening configured for receiving said adapter, a base portion located in a plane which is at an acute angle relative to the rotating axis and a locking mechanism for securing said adapter in a plurality of longitudinal positions relative to said housing;
   wherein said housing includes a viewing opening for viewing the bit engaging the work surface and said adapter includes an opening aligned with said viewing opening.

14. A removable guide attachment according to claim 13 further comprising a vacuum adapter configured for coupling to a port and wherein said housing includes a port configured for receiving said vacuum adapter.

15. A removable guide attachment according to claim 14 wherein said vacuum adapter includes an opening for allowing debris to flow to said port.

16. A removable guide attachment according to claim 13 further comprising a removable base configured for coupling to said housing wherein said removable base includes at least two guide points located 180 degrees apart for guiding the bit and said base portion along the work surface and wherein said housing is configured for receiving said removable base.

17. A removable guide attachment according to claim 13 wherein said housing is configured for allowing the bit to engage a work surface that results from the normal intersection of two planes.

18. A removable guide attachment according to claim 13 wherein said adapter is in the form of a generally hollow cylinder.

19. A removable guide attachment according to claim 13 wherein said at least one longitudinal flange includes an elongated opening for locking said adapter in a plurality of longitudinal positions relative to said housing.

20. A removable guide attachment according to claim 13 wherein said at least one longitudinal flange includes a depth indicator for specifying the depth of the bit on the work surface.

21. A removable guide attachment according to claim 13 wherein said adapter includes at least one longitudinal rib located around a circumference of an outer surface of said adapter for indicating the orientation of said adapter within said housing.

22. A removable guide attachment according to claim 21 wherein said housing includes an upper end portion for engaging said at least one longitudinal rib and preventing said adapter from being pulled outwardly from the housing.

23. A removable guide attachment according to claim 13 wherein said housing includes at least one housing flange for engaging said locking mechanism.

24. A removable guide attachment according to claim 23 wherein said locking mechanism comprises a threaded bolt with an enlarged knob biased toward said at least one housing flange and engaging a captive nut retained in said at least one housing flange, whereby said threaded bolt is configured for passing through said at least one longitudinal flange when rotated into engagement with said at least one housing flange.

25. A removable guide attachment according to claim 13 wherein said housing includes a longitudinal opening configured for receiving said longitudinal flange.

26. A removable guide attachment according to claim 13 wherein said adapter includes a plurality of internal threads.

27. A removable guide attachment according to claim 13 wherein said adapter includes a plurality of internal raised tabs.

* * * * *